United States Patent
Gutman et al.

(10) Patent No.: US 10,831,712 B2
(45) Date of Patent: Nov. 10, 2020

(54) IDENTIFYING AND CORRELATING PHYSICAL DEVICES ACROSS DISCONNECTED DEVICE STACKS

(71) Applicant: CrowdStrike, Inc., Irvine, CA (US)

(72) Inventors: Cameron Gutman, Redmond, WA (US); Aaron LeMasters, New York, NY (US)

(73) Assignee: CrowdStrike, Inc., Irvine, CA (US)

( * ) Notice: Subject to any disclaimer, the term of this patent is extended or adjusted under 35 U.S.C. 154(b) by 223 days.

(21) Appl. No.: 15/993,515

(22) Filed: May 30, 2018

(65) Prior Publication Data

US 2019/0332690 A1  Oct. 31, 2019

Related U.S. Application Data

(60) Provisional application No. 62/663,911, filed on Apr. 27, 2018.

(51) Int. Cl.
| | |
|---|---|
| *H04L 12/24* | (2006.01) |
| *G06F 9/44* | (2018.01) |
| *G06F 21/10* | (2013.01) |
| *H04L 29/06* | (2006.01) |
| *H04W 12/08* | (2009.01) |
| *G06F 16/17* | (2019.01) |
| *G06F 9/4401* | (2018.01) |

(52) U.S. Cl.
CPC ........... *G06F 16/1734* (2019.01); *G06F 9/44* (2013.01); *G06F 9/4403* (2013.01); *G06F 21/10* (2013.01); *H04L 41/0809* (2013.01); *H04L 63/10* (2013.01); *H04W 12/08* (2013.01); *G06F 2213/0042* (2013.01)

(58) Field of Classification Search
CPC ............... G06F 16/1734; G06F 9/4403; G06F 2213/0042; G06F 9/44; G06F 21/10; H04W 12/08; H04L 41/0809; H04L 63/10
See application file for complete search history.

(56) References Cited

U.S. PATENT DOCUMENTS

| | | | | |
|---|---|---|---|---|
| 7,793,279 B1 * | 9/2010 | Le | .......................... | G06F 9/4413 |
| | | | | 717/168 |
| 2004/0003135 A1 * | 1/2004 | Moore | .................. | G06F 9/4413 |
| | | | | 719/321 |

(Continued)

OTHER PUBLICATIONS

The Extended European Search Report dated Jul. 11, 2019 for European Patent Application No. 19170793.4, 8 pages.

*Primary Examiner* — Jay A Morrison
*Assistant Examiner* — Antonio J Caiado
(74) *Attorney, Agent, or Firm* — Lee & Hayes, P.C.

(57) ABSTRACT

Drivers in different functional paths can use different types of identifiers for the same hardware device, such that the drivers may not be able to natively coordinate their actions related to the hardware device due to incompatible identifier types. However, a driver at a file system layer of one functional path can obtain a volume Physical Device Object (PDO) identifier at a volume layer and find a disk PDO identifier at a disk layer that is associated with the same device number. The driver can also find a parent device instance identifier from the disk PDO identifier, and use the parent device instance identifier as a plug-and-play (PnP) identifier for the hardware device during communications with a second driver in a PnP functional path.

20 Claims, 6 Drawing Sheets

(56) References Cited

U.S. PATENT DOCUMENTS

| | | | |
|---|---|---|---|
| 2005/0015702 A1* | 1/2005 | Shier | G06F 11/2273 |
| | | | 714/776 |
| 2005/0120170 A1* | 6/2005 | Zhu | G06F 3/0607 |
| | | | 711/114 |
| 2005/0246723 A1* | 11/2005 | Bhesania | G06F 9/4411 |
| | | | 719/321 |
| 2007/0276966 A1* | 11/2007 | Paul | G06F 9/4411 |
| | | | 710/8 |
| 2010/0257284 A1* | 10/2010 | Kim | G06F 13/385 |
| | | | 710/9 |
| 2011/0289517 A1 | 11/2011 | Sather et al. | |
| 2012/0159010 A1* | 6/2012 | Jiang | G06F 13/102 |
| | | | 710/16 |
| 2014/0033234 A1* | 1/2014 | Wang | G06F 9/4413 |
| | | | 719/327 |
| 2018/0217763 A1* | 8/2018 | Vajravel | G06F 3/0619 |

* cited by examiner

IDENTIFYING AND CORRELATING PHYSICAL DEVICES ACROSS DISCONNECTED DEVICE STACKS

RELATED APPLICATIONS

This U.S. Patent Application claims priority to provisional U.S. Patent Application No. 62/663,911, entitled "Identifying and Correlating Physical Devices Across Disconnected Driver Stacks," filed on Apr. 27, 2018, the entirety of which is incorporated herein by reference.

BACKGROUND

Many operating systems organize device drivers into device stacks, such that multiple drivers in a particular device stack can attach to each other and interact during operations related to a hardware device. However, in some cases different device drivers related to operation of the same hardware device can be positioned in different device stacks that are disconnected from each other in different functional paths. Although an operating system kernel may manage device stacks in different functional paths, most operating systems lack native features that allow a device driver in one functional path to communicate with a device driver in a different functional path to coordinate their activities with respect to a particular hardware device. This can be because different types of identifiers are used in different functional paths to refer to the same hardware device, such that drivers in one functional path would not understand to which hardware device an identifier used by a different functional path is referring.

For example, when a removable Universal Serial Bus (USB) drive is plugged in to a computer, operation of the USB drive may involve actions taken by drivers in a storage functional path, as well as other drivers in a Plug-and-Play (PnP) functional path that is disconnected from the storage functional path. The operating system may lack native features that allow drivers in the storage functional path to directly coordinate with drivers in the PnP driver stack when they are performing operations related to the USB drive, as the storage functional path may use a different identifier for the USB drive than the PnP functional path.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

In a computing device, multiple drivers may be involved in controlling operations of hardware devices, including operations of removable peripherals such as Universal Serial Bus (USB) drives. Some operating systems, such as Microsoft Windows®, use a layered driver model in which individual drivers attach to other drivers in a functional path related to operation of a hardware device. The operating system kernel may have access to drivers in multiple functional paths. However, drivers in different functional paths are generally disconnected from each other, such that drivers in one functional path do not natively have access to drivers in other functional paths.

This disconnect between drivers in different functional paths can occur when different types of identifiers for the same hardware device are used within the different functional paths. Accordingly, a first driver in a first functional path may not be aware of what a second driver in a second functional path is doing, even if both drivers are involved in the operation of the same physical device, because the first driver uses a first type of identifier to refer to the hardware device while the second driver uses an entirely different second type of identifier to refer to that hardware device.

For example, a pair of drivers can be configured to implement policy rules of a blocking policy to block access to a USB drive in certain conditions, such as to protect the computing device from potentially malicious code stored on the USB drive. One of these drivers can be positioned in a Plug-and-Play functional path to selectively block the USB drive from being mounted. The other driver can be positioned in a storage functional path to selectively block individual read or write operations to the USB drive after it has been mounted. Because each of these pair of drivers is positioned in a different functional path, they may refer to the USB drive using different identifiers. As such, if the blocking policy identifies specific types of USB drives that are to be blocked using an identifier that is compatible with one of the functional paths and not the other, the pair of drivers may not be able to coordinate their actions in different situations to fully implement the blocking policy.

However, described herein are systems and methods that can allow a driver in a first functional path to obtain an identifier for a hardware device that is used in a second functional path that is disconnected from the first functional path. The driver can then use that identifier when referring to the hardware device in communications with another driver in the second functional path. The drivers can thus use a common identifier for the same hardware device, and thereby coordinate their actions with respect to the hardware device.

Example Environment

Figure 1:
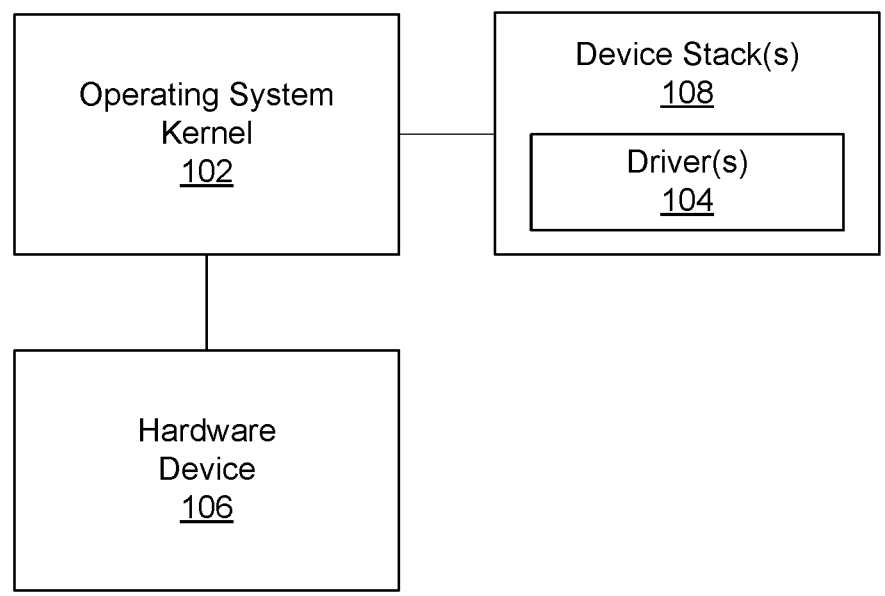
FIG. 1 depicts an exemplary environment in which an operating system (OS) for a computing device includes a kernel that interacts with drivers to manage a hardware device.

FIG. 1 depicts an exemplary environment in which an operating system (OS) for a computing device includes a kernel 102 that interacts with drivers 104 to manage a hardware device 106. Drivers 104 can be organized into one or more device stacks 108. Example architecture for a computing device is illustrated in greater detail in FIG. 6, and is described in detail below with reference to that figure.

The kernel 102 can be a core component of the OS. The kernel 102 can manage and control many aspects of the computing device's operations, including memory management and access to hardware devices 106. The kernel 102 can be one of the first things that loads when the computing device is booted, so that the kernel 102 can manage subsequent start-up tasks for the computing device.

A kernel's code can run in a specific memory area that is not accessible by other applications. This can allow code to run in a kernel mode that may have direct access to hardware. In contrast, other types of applications can run in user mode, in other memory areas that may not have direct access to the kernel's memory area. Although user mode applications may be able to make OS calls to the kernel 102, they may be unable to interfere directly with the kernel's OS functions.

Drivers 104 can manage and control hardware devices 106 of the computing device, including peripheral devices connected to the computing devices through a Universal Serial Bus (USB) interface or any other type of connection. For example, drivers 104 can be used to control operations related to mass storage volumes in hardware devices 106 such as external hard drives, removable thumb drives, USB Attached SCSI (UAS) devices, or other hardware devices.

A driver's access to a hardware device 106 can be managed by elements of the kernel 102. Some drivers 104 can operate in kernel mode such that they have unrestricted and/or direct access to a hardware device 106 through the kernel 102. Other drivers 104 can operate in user mode, and conditionally access a hardware device 106 through OS calls to the kernel 102.

Figure 2:
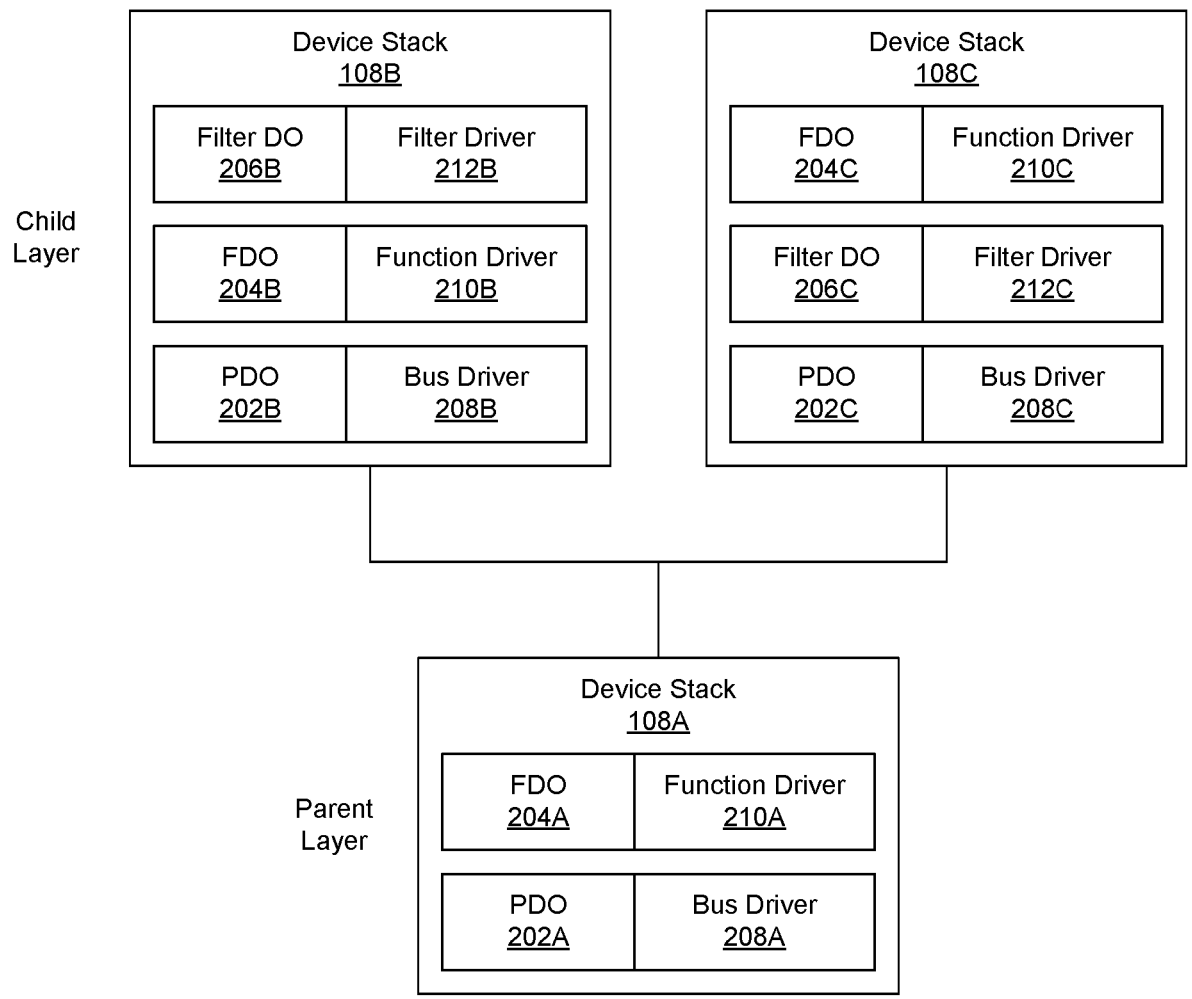
FIG. 2 depicts drivers organized by an operating system into device stacks at different layers of a device tree.

FIG. 2 depicts drivers 104 organized by an operating system into device stacks 108 at different layers of a device tree. Device stacks 108 in the device tree can have parent-child relationships, such that a particular device stack 108 can be a parent to one or more child device stacks 108 in the device tree.

A device stack 108 can represent a hardware device 106 at a particular layer using one or more device objects. For example, a device stack 108 can have a Physical Device Object (PDO) 202, one or more Functional Device Objects (FDOs) 204, and in some cases one or more Filter Device Objects (filter DOs) 206. Each device object can be associated with a particular driver 104 in the device stack 108. For example, a PDO 202 can be associated with a bus driver 208, an FDO 204 can be associated with a function driver 210, and a filter DO can be associated with a filter driver 212.

A function driver 210 associated with an FDO 204 in a device stack 108 can handle read, write, and control requests at the device stack's layer. If a device stack 108 includes one or more filter drivers 212 associated with one or more filter DOs 206, those filter drivers 204 can process or modify requests that the function driver 210 would handle. For example, a filter driver 212 in a device stack 108 can be configured to intercept and block a request to write data to a storage volume under certain conditions, such that the write request is not executed by the function driver 210 in the device stack 108. In some examples, a filter driver 212 can be considered an upper filter driver 212 if it is positioned above a function driver 210 in a device stack 108, while the filter driver 212 can be considered a lower filter driver if it is positioned below a function driver 210 in a device stack 108. For example, in FIG. 2 the filter driver 212B in device stack 108B can be an upper filter driver 212, while the filter driver 212C in device stack 108C can be a lower filter driver 212.

A bus driver 208 associated with a PDO 202 of a child device stack 108 can be the same as a function driver 210 at a parent device stack 108. For example, if a particular driver 104 manages operations that serve as a bus for lower level operations, that driver 104 can serve as a function driver 210 for an FDO 204 at a parent device stack 108 while also serving as a bus driver 208 for a PDO of a child device stack 108. For example, in FIG. 2 the bus driver 208B for the PDO 202B of child device stack 108B can be the same driver 104 as function driver 210A for the FDO 204A of parent device stack 108A.

Figure 3:
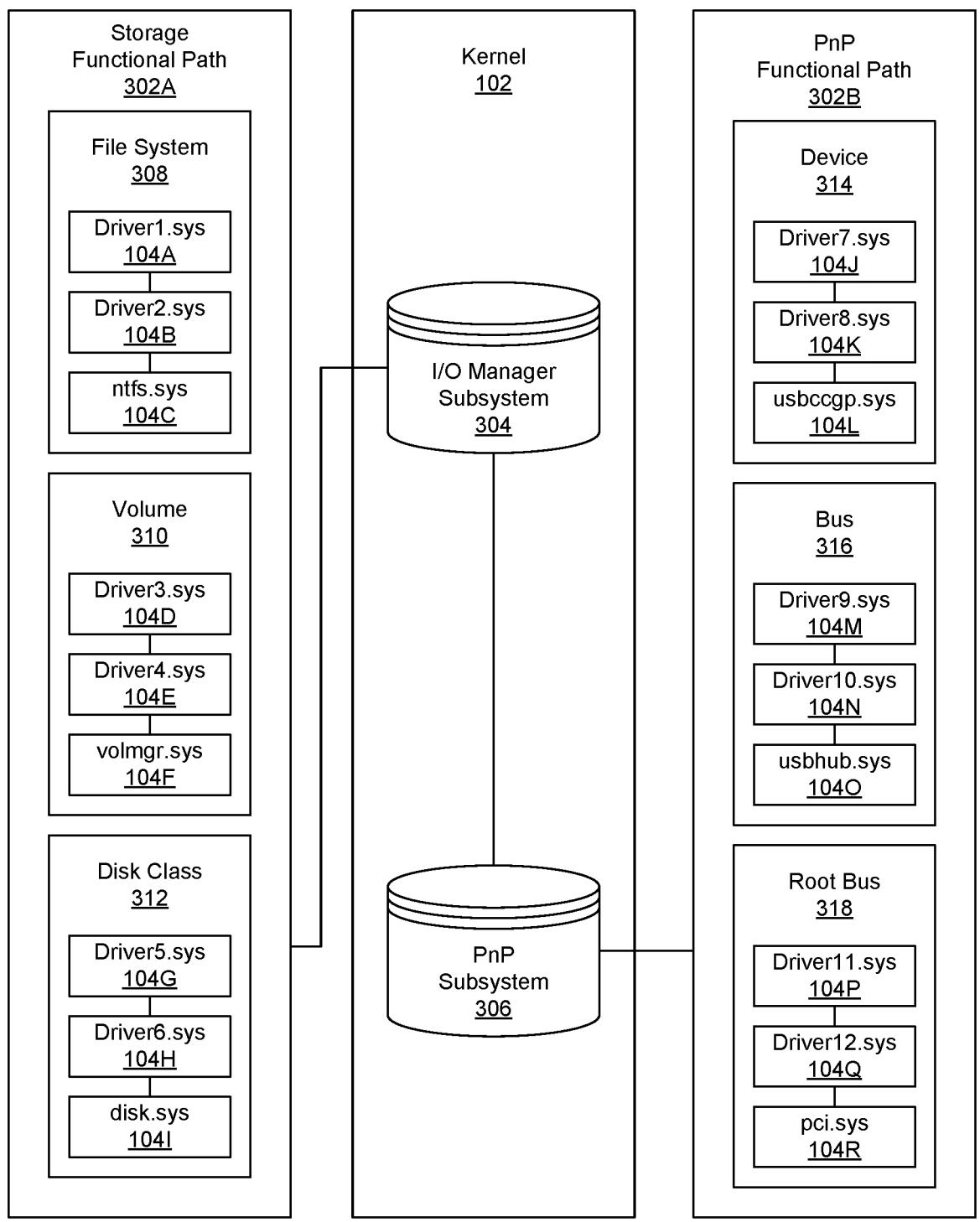
FIG. 3 depicts a non-limiting example in which drivers for a single hardware device in multiple layers of device stacks are organized into disconnected functional paths.

FIG. 3 depicts a non-limiting example in which drivers 104 for a single hardware device 106 in multiple layers of device stacks 108 are organized into disconnected functional paths 302. The different functional paths can be managed by different elements of the kernel 102, such as input/output (I/O) manager subsystem 304 and a Plug-and-Play (PnP) subsystem 306.

Drivers 104 within the same functional path 302 can attach to each other to coordinate their operations. However, drivers 104 within different functional paths 302 can be isolated from each other. For example, many operating systems do not provide a native method of allowing drivers 104 in disconnected functional paths 302 to coordinate with each other or determine when they are performing tasks related to the same hardware device 106, even though the kernel 102 may have visibility into each of the disconnected functional paths 302.

An I/O manager subsystem 304 can manage I/O operations related to a hardware device 106, such as file transfer operations on a connected storage volume. Drivers 104 and device stacks 108 at layers related to file systems for storage volumes can be organized into a storage functional path 302A for the hardware device 106 that is managed by the I/O manager subsystem 304. For example, as shown in FIG. 3, a storage functional path 302A for a particular hardware device 106 can include drivers 104 in multiple device stacks 108 at different layers of a device tree, such as device stacks 108 for layers including a file system 308, a volume 310, a disk class 312, and/or other layers.

A PnP subsystem 306 can set up and manage a PnP hardware device 106 as they are plugged in to the computing device or at system boot, such as setting up and managing USB storage volumes and other peripheral devices. Drivers 104 and device stacks 108 at layers related to interacting with the PnP hardware device 106 and connecting it to other elements of the computing device can be organized into a PnP functional path 302B for the PnP hardware device 106 that is managed by the PnP subsystem 306. For example, as shown in FIG. 3, a PnP functional path 302B for a particular PnP hardware device 106 can include drivers 104 in multiple device stacks 108 at different layers of a device tree, such as device stacks 108 for layers including a device 314, a bus 316, a root bus 318, and/or other layers. As with the storage functional path 302A, the PnP functional path 302B can include multiple PDOs at different layers.

Individual drivers 104 in a particular functional path 302 can natively refer to or access a hardware element using an identifier that includes one or more identifiers specific to one or more layers in that functional path 302. An operating system can provide methods for an individual driver 104 in a functional path 302 to query identifiers for other layers in the same functional path 302. However, different functional paths 302 can use different types of identifiers, such that a driver 104 in one functional path 302 may natively use a type of identifier that is not directly compatible with different type of identifier used by drivers 104 in a different functional path 302.

By way of a non-limiting example, in FIG. 3 a file system identifier for a file stored in the file system 308 can be "<file name>," a file system identifier for the volume 310 can be "DR2," and a file system identifier for the disk 312 can be "Device\Harddisk1." Accordingly, any driver 104 in the storage functional path 302A can reference individual files, storage volumes, or the disk as a whole by using individual ones of these file system identifiers or combinations of these file system identifiers. For example, a driver 104 in the storage functional path 302A can reference a particular file by combining these individual file system identifiers into a full file system identifier such as "\Device\Harddisk1\DR2\<file name>."

As discussed above, device stacks 108 at each layer can have a PDO 202, one or more FDOs 204, and in some cases filter DOs 206, as well as associated drivers 104. Accordingly, the storage functional path 302A for a particular hardware device 106 can include multiple PDOs 202 at multiple layers, such as a PDO 202 at a layer for the disk class 312 and another PDO 202 at a layer for the volume 310. A file system identifier at a particular layer in a functional path 302 can correspond with a name for the PDO 202 of that layer's device stack 108. For example, a name for a PDO 202 at the disk class 312 layer can be a file system identifier such as "Device\Harddisk1," while a name for a PDO 202 at the volume 310 layer can be a file system identifier such as "DR2."

By way of another non-limiting example, in FIG. 3 a PnP identifier for the device 314 can include a vendor identifier (VID), product identifier (PID), and/or other information associated with the specific hardware device 106, such as "VID_19D2&PID_1022&MI_00." A PnP identifier for the bus 316 can be unique identifier constructed for the bus 316 by the PnP subsystem 306 from a string returned by the bus 316, such as "8&f48d0b3&0&0000." A PnP identifier for the root bus 318 can be a root bus enumerator, such as "USB." Accordingly, any driver 104 in the PnP functional path 302B can reference the specific hardware device 106, the bus, or the root bus by using individual ones of these PnP identifiers or combinations of these PnP identifiers. For example, a driver 104 in the PnP functional path 302B can reference the specific hardware device 106 at the device 314 layer by combining these individual PnP identifiers into a full PnP identifier such as "USB\VID_19D2&PID_1022&MI_00\8&f48d0b3&0&0000."

The kernel 102 can have visibility into the drivers 104 within both the storage functional path 302A and the PnP functional path 302B. However, from the perspective of an individual driver 104, the operating system may not provide the driver 104 with a way of directly communicating with, or sharing information with, another driver 104 in a disconnected functional path 302, even if they are working on related tasks for the same hardware device 106. This can be because drivers 104 in different functional paths 302 natively use different types of identifiers for the same hardware device 106 as discussed above, and the drivers 104 may not be able to coordinate their actions when each is referring to the same hardware device 106 using a different identifier.

For example, a driver 104 in the storage functional path 302A can natively refer to a particular USB drive using a file system identifier at the disk class 312 layer, such as "Device\Harddisk1," while another driver 104 in the PnP functional path 302 can refer to that same USB drive using a different PnP identifier at the device 314 layer, such as "VID_19D2&PID_1022&MI_00." Accordingly, even though both drivers 104 may work on operations for the same USB drive, they may be unable to natively coordinate their actions related to the USB drive because they are using different identifiers for the USB drive.

Although an OS may not natively provide a way for drivers 104 in disconnected functional paths 302 to coordinate their actions, such drivers 104 in disconnected functional paths 302 can use the systems and methods described herein to coordinate with each other. For example, a driver 104 in one functional path 302 can request information from the OS that can allow it to map its native identifier for a hardware device 106 to a different identifier for the same hardware device 106 that is used by drivers 104 in a different functional path 302. This can allow drivers 104 in different functional paths 302 to use a common identifier for the same hardware device 106 when communicating with each other.

Figure 4:
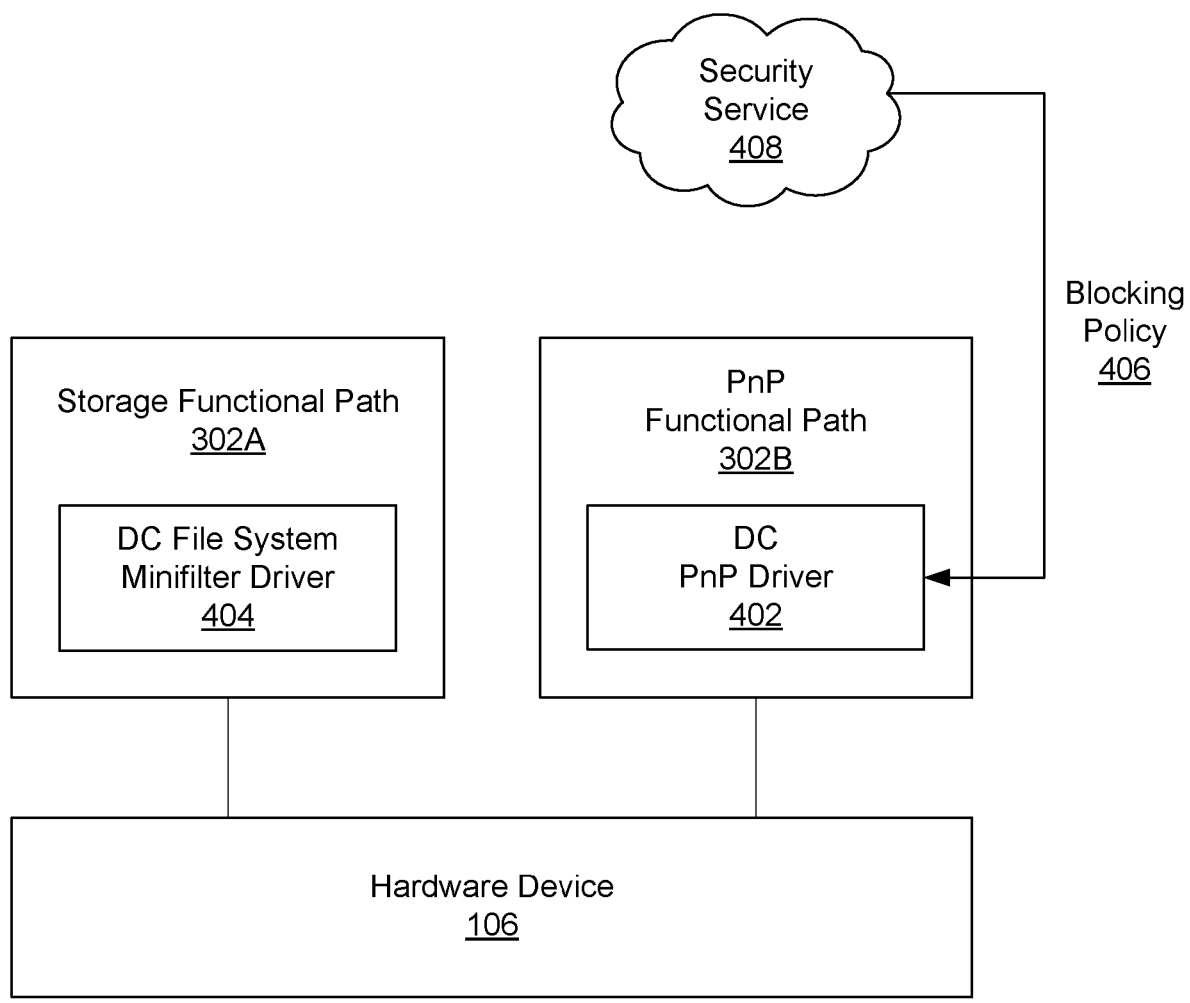
FIG. 4 depicts elements of a Device Control (DC) system that can selectively block access to hardware devices.

FIG. 4 depicts elements of a Device Control (DC) system that can selectively block access to hardware devices 106. A DC system can include a DC PnP driver 402 and a DC file system minifilter driver 404. The DC PnP driver 402 can be in a device stack 108 within a PnP functional path 302B, while the DC file system minifilter driver 404 can be in a device stack 108 within a storage functional path 302A. In some examples, the DC file system minifilter driver 404 can be a filter driver 212 in a device stack 108 at the file system 308 layer of a storage functional path 302A.

The DC PnP driver 402 and the DC file system minifilter driver 404 can serve as enforcement points that can selectively block access to a hardware device 106 according to a blocking policy 406 provided by a security service 408. In some examples, the hardware device 106 can be a USB drive or other type of mass storage device.

A blocking policy 406 can include one or more policy rules that indicate if and when various actions related to a hardware device 106 should be blocked. For example, a policy rule may indicate that a hardware device 106 should be fully blocked, that a hardware device 106 should not be blocked, or that one or more specific operations related to a hardware device 106 should be blocked, such as blocking individual read or write operations when the hardware device 106 is a USB device that includes a mass storage volume. The DC PnP driver 402 can be configured to fully block a hardware device 106 by blocking attempts to mount it according to a blocking policy 406, while the DC file system minifilter driver 404 can be configured to selectively block individual operations of a hardware device 106 after it has been mounted according to a blocking policy 406.

In some examples, a blocking policy 406 can be can be pushed, or pulled, from a cloud server of the security service 408 to an element of the DC system, which can extract or compile the policy rules and save them to a memory location for later reference. For example, the security service 408 can issue a channel file or other type of file that includes a blocking policy 406 stored in a flat binary format that corresponds to a list of one or more policy rules.

After a blocking policy 406 has been received from the security service 408, the DC PnP driver 402 can operate during a system boot and/or when hardware devices 106 are first plugged in to a computing device to selectively block PnP devices according to the blocking policy 406. For example, the blocking policy 406 can include policy rules indicating that certain models of USB drives should be fully blocked. Accordingly, if that model of USB drive is already connected to the computing device when the computing device is first booted or is rebooted, the DC PnP driver 402 can prevent the USB drive from being mounted by the operating system, thereby preventing it from being accessed. If that model of USB drive is not plugged in when the computing device is booted, but is later plugged in after system boot, the DC PnP driver 402 can also prevent the USB drive from being mounted by the operating system according to the blocking policy.

If a blocking policy 406 does not specify that a hardware device 106 should be fully blocked, but instead specifies that certain mass storage devices functions of a hardware device 106 should be blocked, the DC PnP driver 402 can allow the operating system to mount the hardware device 106 as a storage volume. However, once a storage volume of the hardware device 106 has been mounted, the DC file system minifilter driver 404 can selectively block individual requests to access the hardware device 106 within the storage functional path 302A according to the blocking policy 406. For example, the DC file system minifilter driver 404 can be a filter driver 212 that intercepts and blocks some or all read and write requests to a function driver 210 associated with the USB drive at the file system 308 layer, such that access to the USB drive by other applications is effectively blocked even though the USB drive has been mounted by the operating system.

However, although policy rules in a blocking policy 406 can be enforced at either the DC PnP driver 402 or the DC file system minifilter driver 404, the policy rules may use identifiers for hardware devices 106 that are compatible with PnP identifiers used in the PnP functional path 302B and not with file system identifiers used in the storage functional path 302A. Accordingly, although the DC PnP driver 402 may be able to directly determine whether a policy rules applies to a hardware device 106 because it natively uses a similar type of identifier, the DC file system minifilter driver 404 may natively use a different type of identifier for hardware devices 106 such that it cannot directly determine if any policy rules are to be applied.

For example, the security service 408 may determine that a particular USB drive model from a particular vendor contains a security flaw that may have allowed the USB drive to be surreptitiously loaded with malware. The security service 408 can issue a blocking policy 406 with a policy rule indicating that USB drives with a particular VID and/or PID should be blocked. Because PnP identifiers at a device 314 layer in the PnP functional path 302B can include VIDs and/or PIDs, such as "VID_19D2&PID_1022&MI_00," the DC PnP driver 402 can determine if the PnP identifier for a hardware device 106 in the PnP functional path 302B includes a VID or PID that corresponds to any policy rules in a blocking policy 406. However, because a file system identifier for the same hardware device 106 in the storage functional path 302A may be file system identifier at disk class 312 layer such as ""Device\Harddisk1," which does not contain a VID or PID, the DC file system minifilter driver 404 may not be able to natively determine if any policy rules apply to that hardware device 106.

However, the DC file system minifilter driver 404 can perform a series of operations as described below with respect to FIG. 5 to obtain a PnP identifier for the hardware device 106 that is used in the PnP functional path 302B. The DC file system minifilter driver 404 can then map its own native file system identifier for a hardware device 106 to the PnP identifier for the same hardware device 106 that it obtains in response to these queries. The DC file system minifilter driver 404 can then use the mapped PnP identifier for the hardware device 106 to determine if any policy rules that the DC file system minifilter driver 404 can implement apply to that hardware device 106.

In some examples, a callback function of the DC file system minifilter driver 404 can be notified when a mass storage volume of a hardware device 106 is mounted by an operating system. The DC file system minifilter driver 404 can use its native file system identifier for the hardware device 106 to obtain a corresponding PnP identifier for the hardware device 106 as discussed below.

The DC file system minifilter driver 404 can query the DC PnP driver 402 using an obtained PnP identifier for the hardware device 106. Although drivers 104 in disconnected functional paths can natively use different identifiers for the same hardware device 106 as discussed above, in some examples those drivers 104 can access a common bus through which they can communicate. As such, the DC file system minifilter driver 404 can communicate with the DC PnP driver 402 using the obtained PnP identifier via a common bus.

In some examples, the DC PnP driver 402 can return copies of any policy rules that apply to the hardware device 106 identified by the PnP identifier to the DC file system minifilter driver 404. In other examples, the DC PnP driver 402 can return flags that indicate whether specific actions should or should not be blocked at the hardware device 106 according to policy rules that the DC PnP driver 402 determines corresponds to the PnP identifier sent by the DC file system minifilter driver 404. The DC file system minifilter driver 404 can store such flags in a file system instance context. The DC file system minifilter driver 404 can then consult the flags in the file system instance context when it receives a request, such as "IRP_MJ_CREATE" request to create a handle to a file or volume, to determine if the flags indicate that the request should be blocked by the DC file system minifilter driver 404 to enforce the blocking policy 406.

Example Operations

Figure 5:
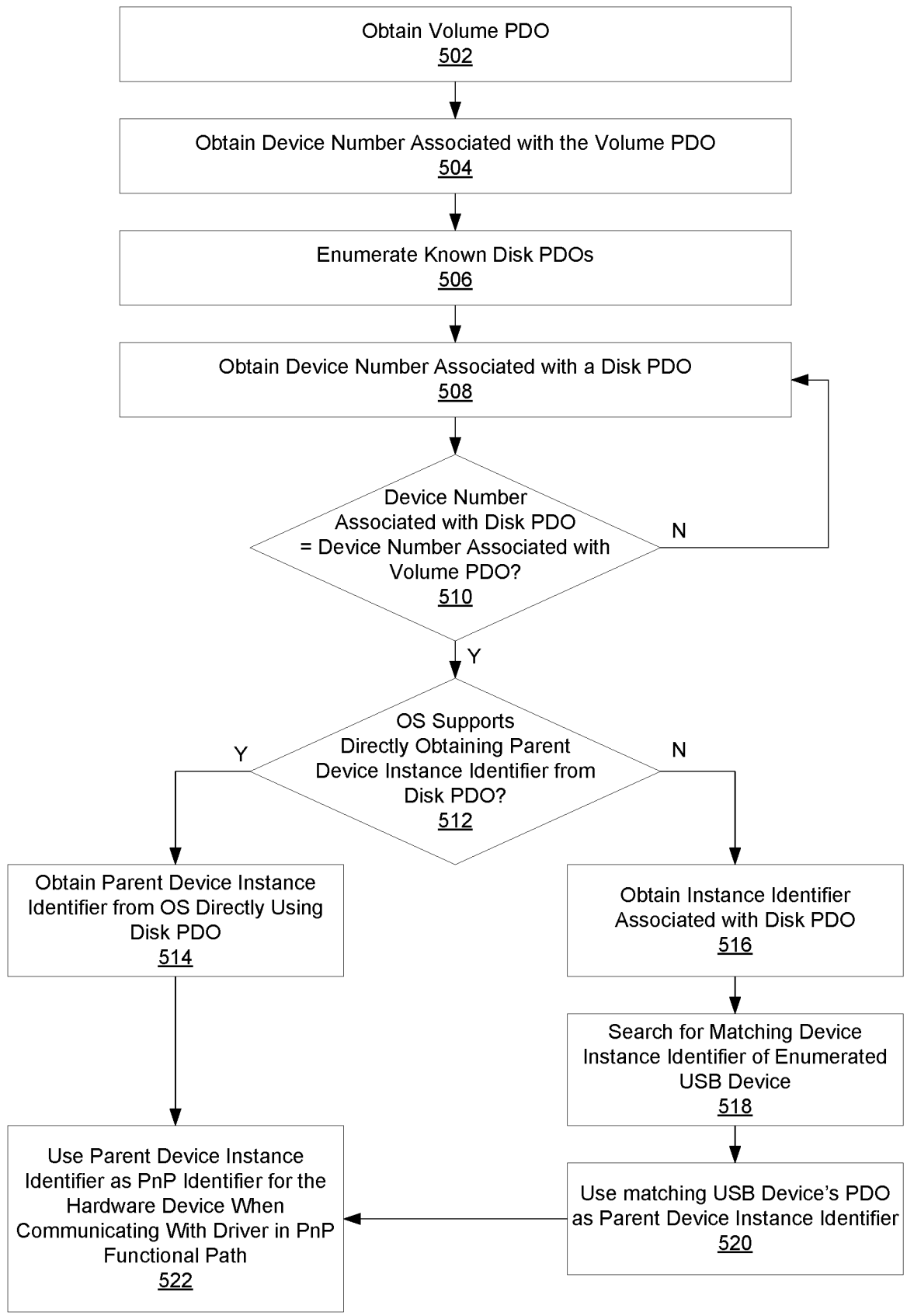
FIG. 5 depicts a flowchart of a process for a driver at a file system layer in a storage functional path to obtain a PnP identifier for a particular hardware device that is used for that hardware device in a disconnected PnP functional path.

FIG. 5 depicts a flowchart of a process for a driver 104 at a file system 308 layer in a storage functional path 302A to obtain a PnP identifier for a particular hardware device 106 that is used for that hardware device 106 in a disconnected PnP functional path 302B. The file system layer driver 104 can then use that PnP identifier to coordinate its actions with respect to the hardware device 106 with one or more drivers 104 in the disconnected PnP functional path 302B.

At step 502, the file system layer driver 104, at the file system 308 layer of a storage functional path 302A, can obtain a name of a PDO 202 at the volume 310 layer of the storage functional path 302A. For example, in Microsoft Windows®, the file system layer driver 104 can use a routine, such as FltGetDiskDeviceObject( ), to obtain a device object for a PDO 202 at the volume 310 layer.

Although the file system layer driver 104 can obtain a volume PDO 202 in step 502, multiple disks may be connected to the computing system. At the file system 308 layer, the driver 104 may be unaware of which disk PDO 202 the volume PDO 202 is associated with. However, the PDO 202 of a volume 310 and the PDO 202 of the disk associated with that volume 310 can both be associated with the same device number. The operating system can assign a unique device number to the hardware device 106 when it is connected to the computing device, such that the unique device number is associated with the hardware device 106 at various layers, including at the disk class 312 layer and at the volume 310 layer. The file system layer driver 104 can accordingly determine which disk PDO 202 is associated with the same device number as the volume PDO in steps 504 through 510.

At step 504, the file system layer driver 104 can use the volume PDO 202 to obtain a device number for the hardware device 106. For example, in Microsoft Windows®, the file system layer driver 104 can obtain the device number using an I/O control code, such as IOCTL_STORAGE_GET_DEVICE_NUMBER, targeting the volume PDO 202.

At step 506, the file system layer driver 104 can enumerate disk PDOs 202 for known disk devices connected to the computing device. In some examples, the file system layer driver 104 can enumerate disk PDOs 202 for all known disk devices at the computing device by checking a registry key or querying the kernel 102 for that information.

At step 508, the file system layer driver 104 can use one of the disk PDOs 202 to obtain a device number associated with that particular disk PDO 202. For example, in Microsoft Windows®, the file system layer driver 104 can obtain the device number associated with a disk PDO 202 using an I/O control code, such as IOCTL_STORAGE_GET_DEVICE_NUMBER, targeting the disk PDO 202.

At step 510, the file system layer driver 104 can compare the device number associated with the volume PDO 203 found during step 502 against the device number found with a disk PDO 202 during step 508. If the device numbers match at step 510, then the file system layer driver 104 can determine that the disk PDO 202 associated with the device number is the correct disk PDO 202 associated with the volume PDO 202, and can move to step 512. However, if the device numbers do not match at step 510, the file system layer driver 104 can return to step 508 to obtain another device number associated with a different disk PDO 202, and then compare that device number with the device number associated with the volume PDO 202 at step 510. This loop can continue until the file system layer driver 104 finds a disk PDO 202 that is associated with the same device number as the volume PDO 202.

At step 512, the file system layer driver 104 can determine if the operating system supports directly obtaining a parent device instance identifier from a disk PDO 202. Some operating systems, such as Microsoft Windows® 8 and up, allow drivers 104 to use a routine such as IoGetDeviceProperty( ) with a DEVPKEY_Device_Parent device property to directly obtain a parent device instance identifier. In this case, the file system layer driver 104 can move to step 514. However, other operating systems, such as Microsoft Windows® 7, do not permit drivers 104 to use a routine such as IoGetDeviceProperty( ) with a DEVPKEY_Device_Parent device property in kernel mode. In this case, the file system layer driver 104 can move to step 516.

At step 514, the file system layer driver 104 can obtain the parent device instance identifier directly using the disk PDO 202. For example, in Microsoft Windows® 8 and up, the file system layer driver 104 can use a routine such as IoGetDeviceProperty( ) on the disk PDO 202 with a DEVPKEY_Device_Parent device property to obtain the parent device instance identifier. The returned parent device instance identifier can be an identifier for a disk controller, which for a hardware device 106 such as a USB drive can be an identifier for the hardware device 106 itself or a composite interface. This parent device instance identifier can be the same as, or substantially similar to, a PnP identifier for the hardware device 106 used in the PnP functional path 302. The file system layer driver 104 can move to step 522.

However, if the operating system is Windows® 7 or any other operating system that does not support directly obtaining a parent device instance identifier from a disk PDO 202, the file system layer driver 104 can indirectly obtain a parent device instance identifier associated with the disk PDO using steps 516 through 520. In some examples, steps 516 through 520 can be used if the hardware device 106 is a USB device, such as a USB mass storage device.

At step 516, the file system layer driver 104 can query an instance identifier associated with the disk PDO. For example, the file system layer driver 104 can query the instance identifier by sending an I/O request packet (IRP), such as IRP_MN_QUERY_ID with a BusQueryInstanceID parameter. In response, a native USB storage function driver 210, such as usbstor.sys, can return an instance identifier for the hardware device 106 in the PnP functional path 302. In some cases, the instance identifier can be an identifier assigned by a native USB hub driver 104, such as usbhub.sys. By way of a non-limiting example, the instance identifier, can be "07012550D1B2A639&0," within which "07012550D1B2A639" is a serial number for the underlying USB mass storage device. In other examples, the instance identifier can be any other type of identifier.

At step 518, the file system layer driver 104 can search for the instance identifier associated with the disk PDO found at step 516 in device instance identifiers of enumerated USB hardware devices 106 connected to the computing device. For example, some device interface classes can be exposed by the PnP functional path 302B such that other programs and/or drivers 104 can find them at runtime, including device interface classes for hubs, host controllers, and devices. One of these device interface classes can be specific to USB hardware devices 106, such as the GUID_DEVINTERFACE_USB_DEVICE class in Windows®. Accordingly, the file system layer driver 104 can use a routine such as IoGetDeviceInterfaces( ) with the device interface class for USB hardware devices 106 in order to enumerate all connected USB hardware devices 106.

The file system layer driver 104 can accordingly search through device instance identifiers for some or all of these enumerated USB hardware devices 106 until if finds one that matches the instance identifier associated with the disk PDO found at step 516. For example, when the instance identifier found during step 516 is a serial number, the file system layer driver 104 can determine if an enumerated USB hardware device's device instance identifier contains that serial number. If it does, then that USB hardware device 106 is the hardware device 106 that the file system layer driver 104 is looking for. The file system layer driver 104 can use the matching USB hardware device's PDO 202 as the parent device instance identifier for the disk PDO at step 520.

At step 522, the file system layer driver 104 can map its own native identifier for the hardware device 106 to the parent device instance identifier found during step 514 or step 520. As mentioned above, the parent device instance identifier can be the same as, or substantially similar to, a PnP identifier for the hardware device 106 that is used in the PnP functional path 302B. Accordingly, the file system layer driver 104 can use that mapped parent device instance identifier when referring to the hardware device 106 in communications with one or more drivers in the PnP functional path 302.

In some examples, the process of FIG. 5 can be used by a file system layer driver 104 such as the DC file system minifilter driver 404 that natively uses a file system identifier for a hardware device 106 in a storage functional path 302A. The DC file system minifilter driver 404 can follow the process of FIG. 5 to also obtain a parent device instance identifier that is the same as the PnP identifier for that hardware device 106 used by drivers 104 in a PnP functional path 302B.

The DC file system minifilter driver 404 can map its file system identifier for the hardware device 106 to the PnP identifier for the hardware device 106 found via the process of FIG. 5. The DC file system minifilter driver 404 can then use the PnP identifier when interacting with a DC PnP driver 402 or other element that uses PnP identifiers. For example, the DC file system minifilter driver 404 can send the mapped PnP identifier for a hardware device 106 to the DC PnP driver 402, instead of its own file system identifier for that hardware device 106. The DC PnP driver 402 can accordingly use the PnP identifier to locate matching policy rules of a blocking policy 406, and either return those matching policy rules or flags indicting which specific actions the matching policy rules indicate should be blocked.

Although FIG. 5 is described in terms of a file system layer driver 104 in a storage functional path 302 obtaining a PnP identifier of a hardware device 106 that is used in a disconnected PnP functional path 302, in other examples a driver 104 within any other type of functional path 302 can use a similar process to obtain an identifier of a hardware device 106 used in another type of functional path 302. For example, a driver 104 at a lower layer of a networking functional path 302 can use similar steps to obtain identifiers or PDOs used for a hardware device 106 at one or more higher layers within the networking functional path 302, and then use those higher-layer identifiers or PDOs to obtain a parent device identifier used for the hardware device 106 in a PnP functional path 302B or other functional path 302. In this example, the driver 104 at the lower layer of the networking functional path 302 can then use the parent device identifier used in the different functional path 302 to communicate with drivers 104 in that different functional path 302.

Example Architecture

Figure 6:
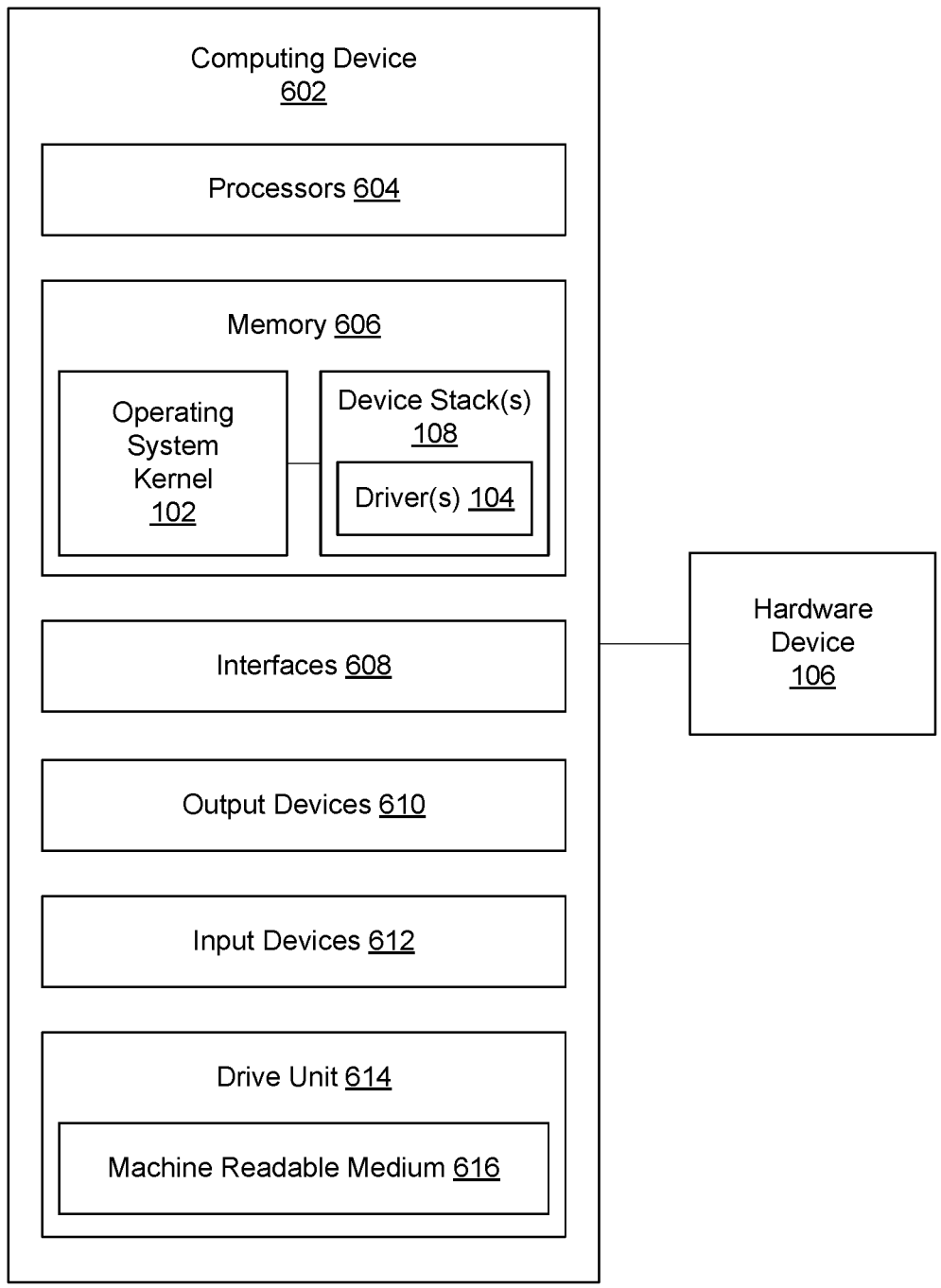
FIG. 6 depicts an example system architecture for a computing device.

FIG. 6 depicts an example system architecture for a computing device 602. A computing device 602 can be a work station, a personal computer (PC), a laptop computer, a tablet computer, a personal digital assistant (PDA), a cellular phone, a media center, an embedded system, a server or server farm, multiple distributed server farms, a mainframe, or any other type of computing device. As shown in FIG. 6, a computing device 602 can include processor(s) 604, memory 606, interface(s) 608, output devices 610, input devices 612, and/or a drive unit 614 including a machine readable medium 616.

In various examples, the processor(s) 604 can be a central processing unit (CPU), a graphics processing unit (GPU), or both CPU and GPU, or any other type of processing unit. Each of the one or more processor(s) 604 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 604 may also be responsible for executing drivers 104 as well as other computer instructions for other applications, routines, or processes stored in the memory 606, which can be associated with common types of volatile (RAM) and/or nonvolatile (ROM) memory.

In various examples, the memory 606 can include system memory, which may be volatile (such as RAM), non-volatile (such as ROM, flash memory, etc.) or some combination of the two. Memory 606 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the computing device 602. Any such non-transitory computer-readable media may be part of the computing device 602.

The memory 606 can store code for the operating system of the computing device 602, including a kernel 102. The memory 606 can also store drivers 104 that can operate in kernel mode and/or user mode. As discussed above, drivers 104 can be organized into device stacks 108, and can also be organized into different functional paths 302. The memory 606 can also store any other modules and data can be utilized by the computing device 602 to perform or enable performing any action taken by the computing device 602. For example, the modules and data can include data for various applications.

The interfaces 608 can link the computing device 602 to other elements through wired or wireless connections. For example, an interface 608 can be a USB interface that can be used to connect a hardware device 106 to the computing device. Other interfaces 608 can be wired networking interfaces such as Ethernet interfaces or other wired data connections. Still other interfaces can be wireless data interfaces that include transceivers, modems, interfaces, antennas, and/or other components, such as a Wi-Fi interface.

The output devices 610 can include one or more types of output devices, such as speakers or a display, such as a liquid crystal display. Output devices 412 can also include ports for one or more peripheral devices, such as headphones, peripheral speakers, and/or a peripheral display. In some examples, a display can be a touch-sensitive display screen, which can also act as an input device 612.

The input devices 612 can include one or more types of input devices, such as a microphone, a keyboard or keypad, and/or a touch-sensitive display, such as the touch-sensitive display screen described above.

The drive unit 614 and machine readable medium 616 can store one or more sets of instructions, such as software or firmware, that embodies any one or more of the methodologies or functions described herein. The instructions can also reside, completely or at least partially, within the processor (s) 604, memory 606, and/or interface(s) 608 during execution thereof by the computing device 602. The processor(s) 604 and the memory 606 can also constitute machine readable media 616.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   determining, by a driver at a file system layer in a storage functional path associated with a mass storage device connected to a computing device, a volume Physical Device Object (PDO) identifier used at a volume layer of the storage functional path;
   determining, by the driver, a device number associated with the volume PDO identifier;

determining, by the driver, a disk PDO identifier used at a disk layer of the storage functional path that is also associated with the device number;

obtaining, by the driver, a parent device instance identifier associated with the disk PDO identifier;

mapping, by the driver, a file system identifier for the mass storage device used by the driver in the storage functional path to the parent device instance identifier; and using, by the driver, the parent device instance identifier as a plug-and-play (PnP) identifier for the mass storage device during communications with a second driver in a PnP functional path.

2. The method of claim 1, wherein obtaining the parent device instance identifier associated with the disk PDO identifier comprises using an operating system routine to directly retrieve the parent device instance identifier based on the disk PDO identifier.

3. The method of claim 1, wherein the mass storage device is a Universal Serial Bus (USB) device and wherein obtaining the parent device instance identifier associated with the disk PDO identifier comprises:

retrieving, by the driver, a device instance identifier associated with the disk PDO identifier;

identifying, by the driver, the mass storage device among one or more enumerated USB devices connected to the computing device based on the mass storage device also being associated with the device instance identifier; and using, by the driver, a USB device PDO identifier associated with the mass storage device as the parent device instance identifier.

4. The method of claim 3, wherein the device instance identifier is an identifier assigned to the mass storage device in the PnP functional path.

5. The method of claim 1, wherein the driver is a device control file system minifilter configured to selectively block individual read or write requests associated with the mass storage device based on information about a blocking policy retrieved from the second driver in response to the communications.

6. The method of claim 5, wherein the blocking policy identifies the mass storage device based on the PnP identifier.

7. The method of claim 5, wherein the second driver is a device control PnP driver configured to selectively block the mass storage device from being mounted at system boot or when the mass storage device is plugged in to the computing device based on the blocking policy.

8. The method of claim 1, wherein the mass storage device is a Universal Serial Bus (USB) device.

9. A method, comprising:

determining, by a driver at a first layer of a functional path associated with a hardware device connected to a computing device, a first Physical Device Object (PDO) identifier used at a second layer of the functional path;

determining, by the driver, a device number associated with the first PDO identifier;

determining, by the driver, a second PDO identifier at a third layer of the functional path that is also associated with the device number;

obtaining, by the driver, a parent device instance identifier associated with the second PDO identifier;

mapping, by the driver, a first identifier for the hardware device used by the driver in the functional path to the parent device instance identifier; and using, by the driver, the parent device instance identifier as a second identifier for the hardware device during communications with a second driver in a different functional path.

10. The method of claim 9, wherein obtaining the parent device instance identifier associated with the second PDO identifier comprises using an operating system routine to directly retrieve the parent device instance identifier based on the second PDO identifier.

11. The method of claim 9, wherein the hardware device is a Universal Serial Bus (USB) device and wherein obtaining the parent device instance identifier associated with the second PDO identifier comprises:

retrieving, by the driver, a device instance identifier associated with the second PDO identifier;

identifying, by the driver, the hardware device among one or more enumerated USB devices connected to the computing device based on the hardware device also being associated with the device instance identifier; and using, by the driver, a USB device PDO identifier associated with the hardware device as the parent device instance identifier.

12. The method of claim 11, wherein the device instance identifier is an identifier assigned to the hardware device in the different functional path.

13. The method of claim 9, wherein the functional path is a storage functional path and the different functional path is a Plug-and-Play (PnP) functional path.

14. The method of claim 9, wherein the functional path is a networking functional path and the different functional path is a Plug-and-Play (PnP) functional path.

15. One or more non-transitory computer-readable media storing computer-executable instructions for a driver that, when executed by one or more processors of a computing device, cause the one or more processors to perform operations comprising:

determining, at a file system layer in a storage functional path associated with a mass storage device connected to the computing device, a volume Physical Device Object (PDO) identifier used at a volume layer of the storage functional path;

determining a device number associated with the volume PDO identifier;

determining a disk PDO identifier used at a disk layer of the storage functional path that is also associated with the device number;

obtaining a parent device instance identifier associated with the disk PDO identifier;

mapping a file system identifier for the mass storage device used at the file system layer in the storage functional path to the parent device instance identifier; and using the parent device instance identifier as a plug-and-play (PnP) identifier for the mass storage device during communications between the driver at the file system layer and a second driver in a PnP functional path.

16. The non-transitory computer-readable media of claim 15, wherein obtaining the parent device instance identifier associated with the disk PDO identifier comprises using an operating system routine to directly retrieve the parent device instance identifier based on the disk PDO identifier.

17. The non-transitory computer-readable media of claim 15, wherein the mass storage device is a Universal Serial Bus (USB) device and wherein obtaining the parent device instance identifier associated with the disk PDO identifier comprises:

retrieving a device instance identifier associated with the disk PDO identifier;

identifying the mass storage device among one or more enumerated USB devices connected to the computing device based on the mass storage device also being associated with the device instance identifier; and using a USB device PDO identifier associated with the mass storage device as the parent device instance identifier.

18. The non-transitory computer-readable media of claim 15, wherein the driver is a device control file system minifilter configured to selectively block individual read or write requests associated with the mass storage device based on information about a blocking policy retrieved from the second driver in response to the communications.

19. The non-transitory computer-readable media of claim 18, wherein the blocking policy identifies the mass storage device based on the PnP identifier.

20. The non-transitory computer-readable media of claim 18, wherein the second driver is a device control PnP driver configured to selectively block the mass storage device from being mounted at system boot or when the mass storage device is plugged in to the computing device based on the blocking policy.

* * * * *